US012157419B1

(12) United States Patent
Li

(10) Patent No.: US 12,157,419 B1
(45) Date of Patent: Dec. 3, 2024

(54) VEHICLE-MOUNTED CHILD MONITORING DEVICE

(71) Applicant: SHENZHEN SULANG TECHNOLOGY CO., LTD, Shenzhen (CN)

(72) Inventor: Zhengzhong Li, Xinshao County, Hunan Province (CN)

(73) Assignee: SHENZHEN SULANG TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/519,083

(22) Filed: Nov. 27, 2023

(51) Int. Cl.
*B60R 11/02* (2006.01)
*B60R 1/29* (2022.01)
*B60R 11/04* (2006.01)
*B60R 11/00* (2006.01)

(52) U.S. Cl.
CPC ................ *B60R 1/29* (2022.01); *B60R 11/04* (2013.01); *B60R 2011/0015* (2013.01); *B60R 2011/0059* (2013.01)

(58) Field of Classification Search
CPC ... B60R 1/29; B60R 11/04; B60R 2011/0015; B60R 2011/0059
See application file for complete search history.

(56) References Cited

U.S. PATENT DOCUMENTS

2014/0096051 A1* 4/2014 Boblett .................. G06F 17/00 715/769
2017/0057423 A1* 3/2017 Wang ...................... B60R 11/04
2019/0215457 A1* 7/2019 Enke ...................... H04N 23/62
2023/0051385 A1* 2/2023 Ma ......................... G06F 13/385
2023/0305160 A1* 9/2023 Li ........................... G01S 17/931

FOREIGN PATENT DOCUMENTS

CN 218162624 U * 12/2022

* cited by examiner

*Primary Examiner* — Patrick E Demosky
(74) *Attorney, Agent, or Firm* — Li & Cai Intellectual Property Office

(57) ABSTRACT

A vehicle-mounted child monitoring device relating to the technology field of monitoring devices is provided, including a base; a camera assembly disposed on the base and configured to take pictures of children in a back passenger seat; a mobile communication device provided with an APP program and configured to be executed in conjunction with the camera assembly; and a connection wire disposed between the camera assembly and the mobile communication device and configured to interconnect the camera assembly and the mobile communication device, so that the camera assembly is electrically connected to the mobile communication device and a video image captured by the camera assembly is stably transmitted to the mobile communication device and displayed on the mobile communication device through the APP program.

10 Claims, 4 Drawing Sheets

1 42 11 431 43 44 41 23 22 25 21 24 26 211

VEHICLE-MOUNTED CHILD MONITORING DEVICE

FIELD OF THE DISCLOSURE

The present disclosure relates to the technology field of monitoring devices, and more particularly to a vehicle-mounted child monitoring device.

BACKGROUND OF THE DISCLOSURE

As a commonly used means of transportation, vehicles have become one of the main modes of travel. Especially for families with children, parents often choose to drive so as to provide their children with a more comfortable travel environment. However, there are also safety hazards. When an accident occurs, the co-pilot seat has a high risk of accidents and children's emergency response capabilities are low, so children are generally arranged in the back passenger seat. However, when children sit in the back passenger seat, the view in the rearview mirror is easily blocked by the seat due to their small size. In addition, because children are curious, they will be interested in things outside the vehicle when riding alone in the back passenger seat. Children may partake in dangerous activity without the driver's awareness, such as leaning out of the vehicle or opening windows and doors at will while being driven at high speed, thus causing the driver to frequently look back to check on the child's condition, which may cause driving accidents and is not conducive to driving safety.

Therefore, the present disclosure provides a vehicle-mounted child monitoring device to monitor children in the back passenger seat of the vehicle, so that the driver can check the child's condition in real time while ensuring the driving safety.

SUMMARY OF THE DISCLOSURE

The purpose of the present disclosure is to provide a vehicle-mounted child monitoring device in view of the phenomenon in the prior art that drivers need to frequently look back to check the status of children in the back passenger seat of the vehicle when driving, which may lead to driving accidents and is not conducive to driving safety.

In order to achieve the above-mentioned purpose, the present disclosure provides a vehicle-mounted child monitoring device, including: a base; a camera assembly disposed on the base and configured to take pictures of children in a back passenger seat; a mobile communication device provided with an APP program and configured to be executed in conjunction with the camera assembly; and a connection wire disposed between the camera assembly and the mobile communication device and configured to interconnect the camera assembly and the mobile communication device, so that the camera assembly is electrically connected to the mobile communication device and a video image captured by the camera assembly is stably transmitted to the mobile communication device and displayed on the mobile communication device through the APP program.

In preferred embodiments, the connection wire has a power input port and a data output port. The power input port is configured to be connected to a vehicular power supply to supply power to the camera assembly, and the data output port is configured to be connected to the mobile communication device, so that the video image captured by the camera assembly is transmitted to the mobile communication device and displayed on the mobile communication device through the APP program.

In preferred embodiments, the power input port is a USB interface, and the data output port is a Lightning interface or a Type-C port.

In preferred embodiments, the mobile communication device includes two display modes, one of which is a full-screen display mode, another of which is a floating window display mode, and the mobile communication device is freely switched between the full-screen display mode and the floating window display mode.

In preferred embodiments, the camera assembly includes a housing, a camera disposed in the housing, and a first circuit board fixedly disposed in the housing. A lens through hole is provided on a side of the housing away from the base, a shooting end of the camera faces the lens through hole, the camera is electrically connected to the first circuit board, and the first circuit board is electrically connected to the mobile communication device through the connection wire.

In preferred embodiments, the camera assembly further includes a second circuit board disposed in the housing, a plurality of infrared lights provided on the second circuit board, and a photoresistor provided on the second circuit board. The second circuit board is provided on a side of the first circuit board facing the lens through hole, the second circuit board is electrically connected to the first circuit board, each of the plurality of infrared lights is electrically connected to the second circuit board and faces the lens through hole, and the photoresistor is provided on the second circuit board and electrically connected to the second circuit board.

In preferred embodiments, an angle adjustment mechanism configured to adjust a shooting angle of the camera is disposed between the housing and the base. The angle adjustment mechanism includes a ball cup provided on an outer shell, a mounting seat provided on the base, an elastic claw sleeve provided on the mounting base, and a fastener configured to tighten the elastic claw sleeve. One end of the ball cup is connected to the outer shell, the mounting seat is provided on a side of the base facing the housing, an accommodating groove configured to accommodate a head of the ball cup is provided on a side of the elastic claw sleeve facing the ball cup, and when the elastic claw sleeve is not tightened by the fastener, the head of the ball cup rotates relative to the accommodating groove.

In preferred embodiments, the fastener includes an adjusting nut sleeved on the elastic claw sleeve, and external threads configured for a threaded cooperation with the adjusting nut are provided on an outer side of the elastic claw sleeve.

In preferred embodiments, a control box is further disposed between the camera assembly and the mobile communication device, a control panel is provided in the control box, the control panel is correspondingly and electrically connected to the camera assembly and the mobile communication device through the connection wire, and a control button configured to turn on or turn off the camera assembly is further provided on the control panel.

In preferred embodiments, a mounting hole is provided on the base, and the mounting hole passes through the base and is configured to tie and fix the base to a rear side of a front passenger seat of a vehicle through a strap.

By means of the aforementioned technical solution, the present disclosure has at least the following beneficial effects.

1. The present disclosure fixes the base to the rear side of the front passenger seat of the vehicle, so that the camera assembly can take pictures of children in the back passenger seat of the vehicle, and the captured video image can be stably transmitted to the mobile communication device through the connection wire, and is displayed on the mobile communication device through the APP program. Therefore, the driver can check the child's condition in real time while ensuring driving safety, thereby reducing the occurrence of driving accidents and ensuring the safety of the driver and children.

2. By virtue of a cooperation between the ball cup, the elastic claw sleeve and the adjusting nut, when adjusting the shooting angle of the camera assembly, the adjusting nut is first loosened so that the ball head base can rotate relative to the elastic claw sleeve and the camera assembly can rotate relative to the base, thereby achieving the adjustment of the shooting angle of the camera assembly. After the shooting angle adjustment is completed, the shooting angle of the camera assembly can be locked by tightening the adjusting nut. The operation of the present disclosure is convenient and highly practical, and the present disclosure has good market promotion prospects.

3. When displaying the video captured by the camera assembly, the mobile communication device of the present disclosure can be freely switched between the full-screen display mode and the floating window display mode, which can meet user's different usage needs.

4. By providing the power input port and the data output port connected to the connection wire, the present disclosure can not only supply power to the camera assembly, so that the camera assembly can stably conduct real-time monitoring of the back passenger seat of the vehicle, but also charge the mobile communication device to ensure that the mobile communication device has sufficient power and is highly practical.

BRIEF DESCRIPTION OF THE DRAWINGS

In order to explain the embodiments of the present disclosure or the technical solutions in the prior art more clearly, the drawings needed to be used in the description of the embodiments or the prior art will be briefly introduced below. Obviously, the drawings in the following description are only some embodiments of the present disclosure. For those of ordinary skill in the art, other drawings can be obtained based on these drawings without exerting any creative effort.

Figure 1:
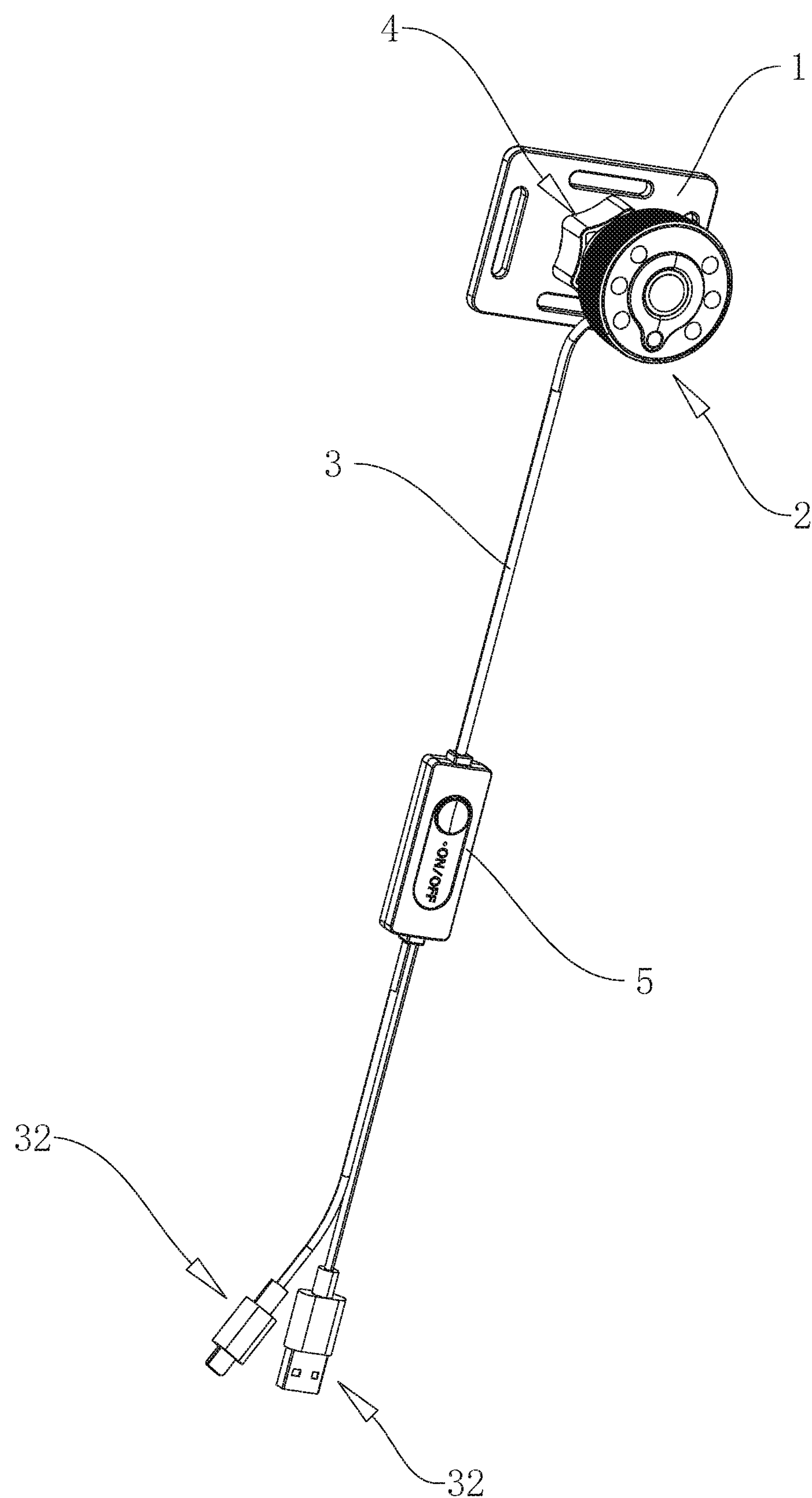
FIG. 1 is a schematic diagram of an overall structure according to an embodiment.

Reference numeral: 1, base; 11, mounting hole; 2, camera assembly; 21, housing; 211, lens through hole; 22, camera; 23, first circuit board; 24, second circuit board; 25, infrared light; 26, photoresistor; 3, connection wire; 31, power input port; 32, data output port; 4, angle adjustment mechanism; 41, ball cup; 42, mounting base; 43, elastic claw sleeve; 431, accommodation groove; 44, adjusting nut; 5, control box; 51, control panel; 52, control button.

DETAILED DESCRIPTION OF THE EXEMPLARY EMBODIMENTS

The technical solutions in the embodiments of the present disclosure will be clearly and completely described below with reference to the accompanying FIGS. 1-4 in the embodiments of the present disclosure. Obviously, the described embodiments are only some of the embodiments of the present disclosure, but not all of the embodiments. Based on the embodiments of the present disclosure, all other embodiments obtained by those of ordinary skill in the art without creative efforts fall within the scope of protection of the present disclosure.

It should be noted that the terms "center", "vertical", "horizontal", "upper", "lower", "front", "back", "left", "right", "top", and other orientations or positional relationships indicated by "bottom", "inner", "outside", "back", "side", "circumferential", etc. are based on the orientations or positional relationships shown in the drawings, and are only for the convenience of describing the present disclosure and the simplified description, and are not intended to indicate or imply that the device or element referred to must have a specific orientation, be constructed and operate in a specific orientation, and therefore are not to be construed as a limitation of the present disclosure. In addition, words such as first and second are only used to distinguish multiple components or structures with the same or similar structure, and do not indicate any special limitation on the arrangement order or connection relationship.

Figure 2:
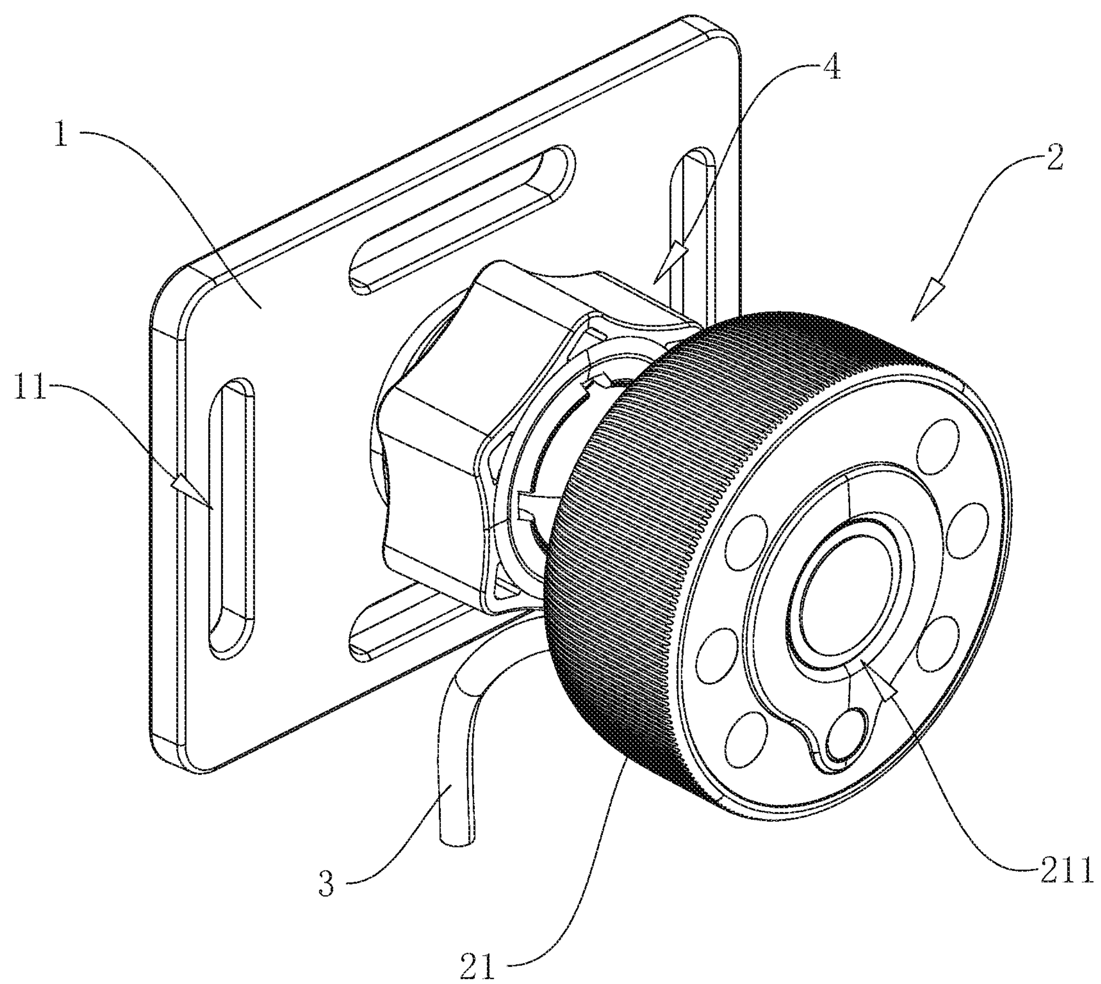
FIG. 2 is a schematic diagram showing an assembly relationship between a base, a camera assembly and an angle adjustment mechanism.

The present embodiment relates to a vehicle-mounted child monitoring device used to monitor children in the back passenger seat of the vehicle. Reference is made to FIGS. 1 and 2. The vehicle-mounted child monitoring device of the present disclosure includes a base 1, a camera assembly 2, a mobile communication device and a connection wire 3. The base 1 is roughly arranged in a rectangular parallelepiped shape. The camera assembly 2 is rotatably disposed on the base 1. The camera assembly 2 is used to take pictures of children in the back passenger seat of the vehicle. The mobile communication device is a mobile phone, a tablet, etc. The mobile communication device is provided with an APP program configured to be executed in conjunction with the camera assembly 2. The connection wire 3 is disposed between the camera assembly 2 and the mobile communication device for interconnecting the camera assembly 2 and the mobile communication device, so that the camera assembly 2 is electrically connected to the mobile communication device and the video image captured by the camera assembly 2 can be stably transmitted to the mobile communication device and displayed on the mobile communication device through the APP program.

It can be understood that the child in the back passenger seat of the vehicle is photographed through the camera assembly 2, and the captured real-time video picture is transmitted to the mobile communication device through the connection wire 3 for the display on the mobile communication device through the APP program, so as to achieve the real-time monitoring of children in the back passenger seat of the vehicle. Therefore, the driver can see the movements of the children without having to look back, thereby ensuring driving safety and reducing the occurrence of driving accidents.

In addition, it should be noted that in the present embodiment, when the camera assembly 2 is connected to the mobile communication device through the connection wire, real-time photos or videos can be taken on the APP program and saved in the mobile communication device so that the photos and videos taken can be shared with others using social software.

Further, in the present embodiment, the connection wire 3 has a power input port 31 and a data output port 32. The power input port 31 is configured to be connected to the vehicular power supply to achieve the power supply to the camera assembly 2, and the data output port 32 is configured to be connected to the mobile communication device, so that the video image captured by the camera assembly 2 can be transmitted to the mobile communication device and displayed on the mobile communication device through the APP program. In addition, data transmission through the connection wire 3 is more stable than wireless transmission, which avoids the situation where the mobile communication device cannot stably display the real-time picture of the child in the back passenger seat when driving to an area having poor signal.

Further, the power input port 31 is a USB interface for connecting to a USB socket inside the vehicle, and the data output port 32 is a Lightning interface or a Type-C port for connecting to mobile communication devices of different brands through the data output port 32.

Furthermore, when the mobile communication device displays the video picture captured by the camera assembly 2, the mobile communication device has two display methods to display the video picture, one of which is a full-screen display mode, and another of which is a floating window display mode. The mobile communication device can be freely switched between the full-screen display mode and the floating window display mode.

When in use, the camera assembly 2 is connected to the mobile communication device through the connection wire 3. The mobile communication device will pop up a confirmation window asking the user whether or not to display the video image captured by the camera assembly 2. When the confirmation is displayed, the mobile communication device will automatically start the APP program executed in conjunction with the camera assembly 2. At this time, the APP program interface is provided and displays the video image captured by the camera assembly 2, and the display can be freely switched between the full-screen display mode and the floating window display mode according to the driver's needs. For example, when the driver wants to monitor the picture of the back passenger seat more carefully, the mobile communication device can be selected to be displayed in the full-screen display mode, and when the driver does not want to affect the display of other pictures, for example, in order not to affect the display of the map navigation screen, the driver can choose to display through the floating window display mode window. When it is confirmed that it is not displayed, the mobile communication device is charged through the power input port 31 and the data output port 32 connected to the connection wire to ensure the power of the mobile communication device.

Figure 3:
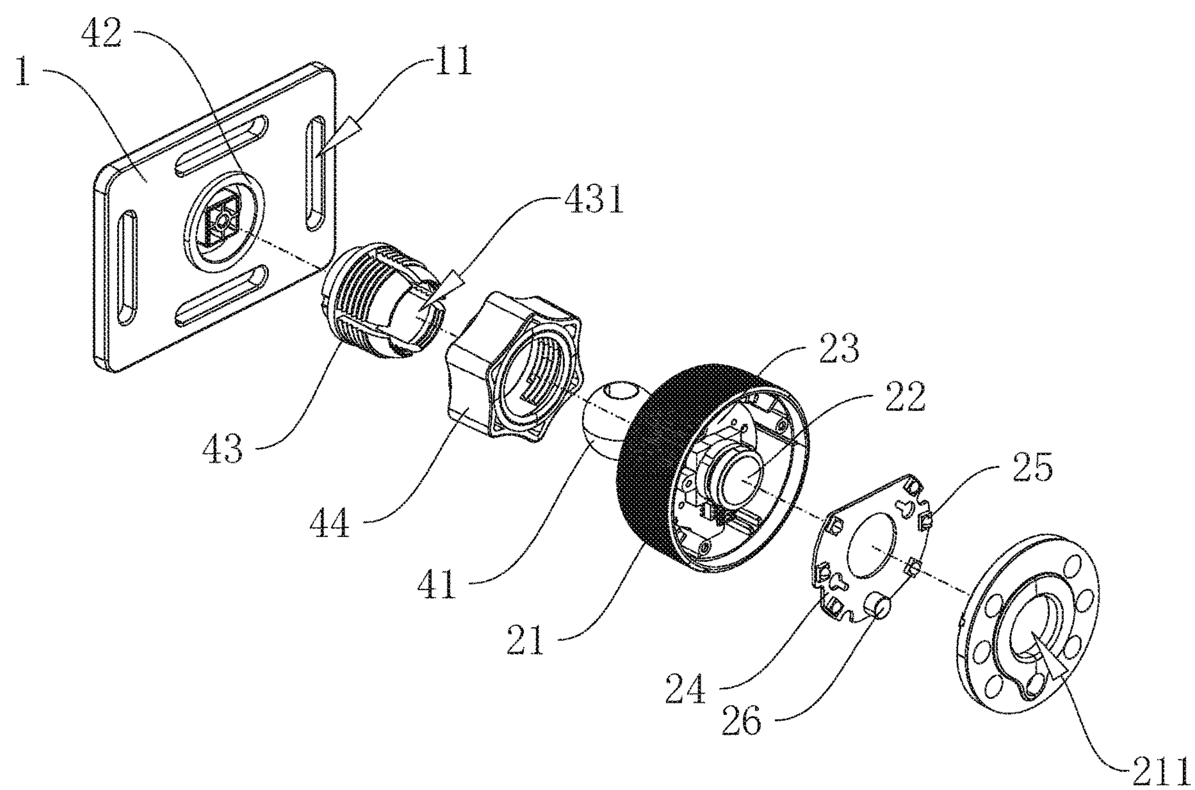
FIG. 3 is an exploded view of FIG. 2.

Further, reference is made to FIGS. 2 and 3. The camera assembly 2 includes a housing 21, a camera 22 disposed on the housing 21, and a first circuit board 23 fixedly disposed in the housing 21. A lens through hole 211 is provided on one side of the housing 21 away from the base 1. A transparent lens is provided at the lens through hole 211. The first circuit board 23 is fixedly disposed on another side of the housing 21 adjacent to the base 1. The first circuit board 23 is electrically connected to the mobile communication device through the connection wire 3, the camera 22 is fixedly mounted on the first circuit board 23 and electrically connected to the first circuit board 23, and a shooting end of the camera 22 faces the lens through hole 211.

Further, the camera assembly 2 includes a second circuit board 24 fixedly disposed in the housing 21, a plurality of infrared lights 25 provided on the second circuit board 24, and a photoresistor 26 provided on the second circuit board 24. The second circuit board 24 is provided on the side of the first circuit board 23 facing the lens through hole 211. A through hole for the camera 22 to pass through is provided on the second circuit board 24, and the second circuit board 24 is electrically connected to the first circuit board 23. The plurality of infrared lights 25 all face the lens through hole 211 and are evenly distributed around the through hole. Each of the plurality of infrared lights 25 is electrically connected to the second circuit board 24. The photoresistor 26 is provided on a side of the second circuit board 24 facing the lens through hole 211 and electrically connected to the second circuit board 24. In the present embodiment, a number of infrared lights 25 is six, and the six infrared lights 25 are evenly distributed around the second circuit board 24. The photoresistor 26 is specifically a photosensitive resistor.

It can be understood that through the settings of the second circuit board 24, the plurality of infrared lights 25 and the photoresistor 26, the plurality of infrared lights can be automatically turned on when the light in the vehicle is insufficient, and can be switched to the daytime mode when the light is sufficient to ensure the clarity of the image captured by the camera assembly 2.

Furthermore, an angle adjustment structure for adjusting the shooting angle of the camera 22 is disposed between the housing 21 and the base 1 so that the camera 22 can shoot the children in the back passenger seat of the vehicle at any angle.

Specifically, the angle adjustment mechanism 4 includes a ball cup 41 provided on the outer shell, a mounting seat 42 provided on the base 1, an elastic claw sleeve 43 provided on the mounting base 42, and a fastener for tightening the elastic claw sleeve 43. One end of the ball cup 41 is fixedly connected to the side of the outer shell away from the lens through hole 211, the head of the ball cup 41 is arranged in a spherical shape, and the mounting seat 42 is fixedly mounted on a side of the base 1 facing the housing 21. The elastic claw sleeve 43 is fixedly mounted on the mounting base 42. The accommodating groove 431 for accommodating the head of the ball cup 41 is provided on the elastic claw sleeve 43. When the elastic claw sleeve 43 is not tightened by the fastener, the elastic claw sleeve 43 is in a loosened state while the ball cup 41 can rotate relative to the accommodating groove 431.

The fastener includes an adjusting nut 44 sleeved on the elastic claw sleeve 43. External threads for screw thread matching with the adjusting nut 44 are provided on an outside side of the elastic claw sleeve 4.

It can be understood that when it is necessary to adjust the shooting angle of the camera 22, the adjusting nut 44 is loosened so that the elastic claw sleeve 43 is in a loosened state. At this time, the ball cup 41 can be driven to rotate relative to the elastic claw sleeve 43 according to actual needs so as to adjust the shooting angle of the camera 22. After the shooting angle adjustment of the camera 22 is completed, the elastic claw sleeve 43 is tightened by tightening the adjusting nut 44, so that the head of the ball cup 41 is in the accommodating groove 431 and therefore becomes difficult to rotate, that is, the shooting angle of the camera 22 is locked at this time. Therefore, the camera 22 can stably shoot the children in the back passenger seat of the vehicle, so as to meet user's needs for different shooting angles, and have a wide range of applications.

Figure 4:
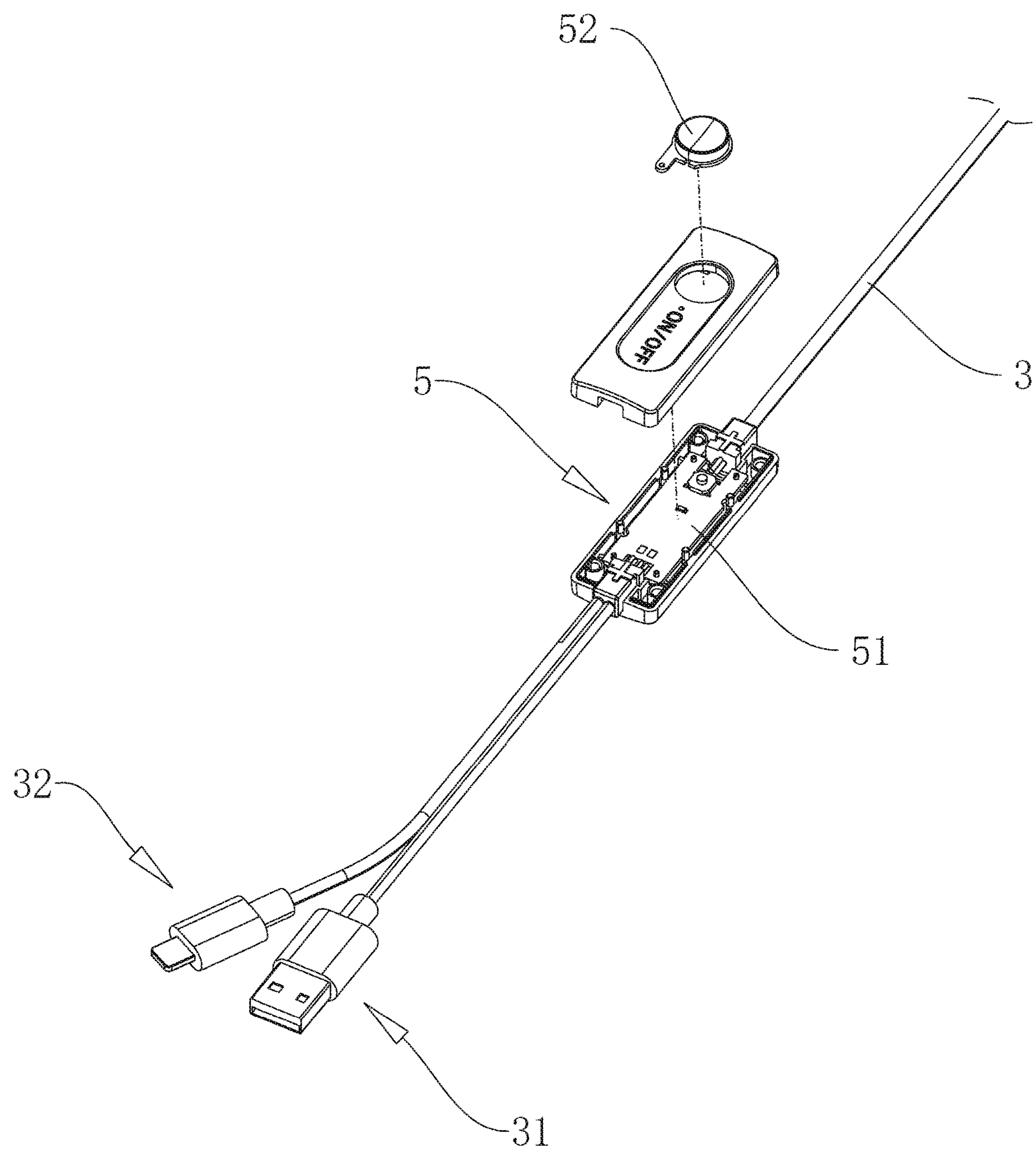
FIG. 4 is an exploded view of the control box according to an embodiment.

Further, reference is made to FIG. 4. A control box 5 is disposed between the camera assembly 2 and the mobile communication device. A control panel 51 is provided in the control box 5. The control panel 51 is correspondingly and electrically connected to the camera assembly 2 and the mobile communication device through the connection wire 3, and a control button 52 for turning on or turning off the camera assembly 2 is provided on the control panel 51.

It can be understood that during actual use, the control box 5 can be placed in a position convenient for the driver to access, and the camera assembly 2 can be turned on or turned off through the control button 52, that is, the children's monitoring of the back passenger seat of the vehicle can be turned on or turned off, which is easy to operate and highly practical.

In addition, in order to enable the camera assembly 2 to stably take pictures of children in the back passenger seat of the vehicle, a mounting hole 11 is provided on the base 1, and the mounting hole 11 passes through the base 1 and is configured to tie and fix the base 1 to the rear side of the front passenger seat of the vehicle through a strap. In the present embodiment, a number of the mounting holes 11 is four. The four mounting holes 11 are symmetrically provided on the peripheral side of the base 1, and all the four mounting holes 11 are waist-shaped holes.

The working principle of the present disclosure is roughly as follows. When in use, a strap is used to tie and fix the base 1 to the rear side of the front passenger seat of the vehicle, so that the camera 22 faces the back passenger seat of the vehicle; at this time, the connection wire 3 is used to electrically connect the camera assembly 2 with the mobile communication device, and electrically connect the vehicular power supply, and the camera assembly 2 is turned on through the control button 52, so that the shooting of the back passenger seat of the vehicle is achieved, that is, the real-time monitoring of the children in the back passenger seat of the vehicle is achieved. By means of the connection of the wire 3, the captured video image is stably transmitted to the mobile communication device and displayed on the mobile communication device through the APP program, so that the driver can see the video on the back passenger seat of the vehicle without having to look back at the children's condition, thereby reducing the occurrence of driving accidents to a certain extent and ensuring driving safety.

The present disclosure has been described in detail through specific embodiments. These detailed descriptions are only intended to help those skilled in the art understand the content of the present disclosure and cannot be construed as limiting the scope of the present disclosure. Various modifications, equivalent transformations, etc. made to the above solutions by those skilled in the art under the concept of the present disclosure should be included in the protection scope of the present disclosure.

What is claimed is:

1. A vehicle-mounted child monitoring device, comprising:

a base;

a camera assembly disposed on the base and configured to take pictures of children in a back passenger seat;

a mobile communication device provided with an APP program configured to be executed in conjunction with the camera assembly; and a connection wire disposed between the camera assembly and the mobile communication device and configured to interconnect the camera assembly and the mobile communication device, so that the camera assembly is electrically connected to the mobile communication device and a video image captured by the camera assembly is stably transmitted to the mobile communication device and displayed on the mobile communication device through the APP program, wherein the camera assembly includes a housing and a camera disposed in the housing, a lens through hole is provided on a side of the housing away from the base, and a shooting end of the camera faces the lens through hole, wherein an angle adjustment mechanism configured to adjust a shooting angle of the camera is disposed between the housing and the base, and the angle adjustment mechanism includes a ball cup, a mounting seat, an elastic claw sleeve, and an adjusting nut;

wherein the mounting seat is disposed on the base; the elastic claw sleeve is fixedly mounted on the mounting base; and a part of the ball cup is disposed in an accommodating groove penetrating through the elastic claw sleeve, wherein an inner side of the adjusting nut is threadedly engaged to an outer side of the elastic claw sleeve, when the elastic claw sleeve is not tightened by the adjusting nut, the part of the ball cup rotates relative to the accommodating groove.

2. The vehicle-mounted child monitoring device according to claim 1, wherein the connection wire has a power input port and a data output port; the power input port is configured to be connected to a vehicular power supply to supply power to the camera assembly, and the data output port is configured to be connected to the mobile communication device, so that the video image captured by the camera assembly is transmitted to the mobile communication device and displayed on the mobile communication device through the APP program.

3. The vehicle-mounted child monitoring device according to claim 2, wherein the power input port is a USB interface, and the data output port is a Lightning interface or a Type-C port.

4. The vehicle-mounted child monitoring device according to claim 1, wherein the mobile communication device includes two display modes, one of which is a full-screen display mode, another of which is a floating window display mode, and the mobile communication device is freely switched between the full-screen display mode and the floating window display mode.

5. The vehicle-mounted child monitoring device according to claim 1, wherein the camera assembly further includes a first circuit board fixedly disposed in the housing; a lens through hole is provided on a side of the housing away from the base, a shooting end of the camera, the camera is electrically connected to the first circuit board, and the first circuit board is electrically connected to the mobile communication device through the connection wire.

6. The vehicle-mounted child monitoring device according to claim 5, wherein the camera assembly further includes a second circuit board disposed in the housing, a plurality of infrared lights provided on the second circuit board, and a photoresistor provided on the second circuit board; the second circuit board is provided on a side of the first circuit board facing the lens through hole, the second circuit board is electrically connected to the first circuit board, each of the plurality of infrared lights is electrically connected to the second circuit board and faces the lens through hole, and the photoresistor is electrically connected to the second circuit board.

7. The vehicle-mounted child monitoring device according to claim 5, wherein one end of the ball cup is connected to an outer shell, and the mounting seat is provided on a side of the base facing the housing.

8. The vehicle-mounted child monitoring device according to claim 7, wherein external threads configured for a threaded cooperation with the inner side of the adjusting nut are provided on the outer side of the elastic claw sleeve.

9. The vehicle-mounted child monitoring device according to claim 1, wherein a control box is further disposed between the camera assembly and the mobile communication device, a control panel is provided in the control box, the control panel is correspondingly and electrically connected to the camera assembly and the mobile communication device through the connection wire, and a control button configured to turn on or turn off the camera assembly is further provided on the control panel.

10. The vehicle-mounted child monitoring device according to claim 1, wherein a mounting hole is provided on the base, and the mounting hole passes through the base and is configured to tie and fix the base to a rear side of a front passenger seat of a vehicle through a strap.

* * * * *